US007782900B2

(12) United States Patent
Bachl et al.

(10) Patent No.: US 7,782,900 B2
(45) Date of Patent: Aug. 24, 2010

(54) METHOD FOR INCREASING SPECTRUM EFFICIENCY IN AN OFDM BASED MULTI-BANDWIDTH WIRELESS SYSTEM

(75) Inventors: Rainer Walter Bachl, Bavaria (DE); Fang-Chen Cheng, Randolph, NJ (US); James Paul Seymour, North Auora, IL (US); Lei Song, Randolph, NJ (US); Said Tatesh, Swindon (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 498 days.

(21) Appl. No.: 11/415,993

(22) Filed: May 1, 2006

(65) Prior Publication Data

US 2007/0253381 A1  Nov. 1, 2007

(51) Int. Cl.
*H04J 3/16* (2006.01)
(52) U.S. Cl. .................. 370/468; 455/450; 455/509
(58) Field of Classification Search ............... 370/338, 370/344
See application file for complete search history.

(56) References Cited

U.S. PATENT DOCUMENTS 6,490,314 B1   12/2002  Khayrallah et al. ......... 375/132
6,768,714 B1 *  7/2004  Heinonen et al. .......... 370/208
2005/0265221 A1 * 12/2005  Batra et al. ............... 370/208
2007/0002898 A1 *  1/2007  Boariu et al. ............. 370/468

FOREIGN PATENT DOCUMENTS

WO    WO 02/03717 A2        1/2002
WO    WO 2004045228 A1 *    5/2004
WO    WO 2004/112325 A1    12/2004

OTHER PUBLICATIONS

International Search Report mailed Nov. 6, 2007.
Written Opinion of the International Searching Authority.
XP-002455885—TSG-RAN WG1 #42bis, London, UK, Oct. 10-14, 2005; Lucent Technologies, France Telecom "*Windowing and Spectral Containment for OFDM Downlink*".

* cited by examiner

*Primary Examiner*—Rafael Pérez-Gutiérrez
*Assistant Examiner*—Marcos Batista
(74) *Attorney, Agent, or Firm*—Williams, Morgan + Amerson, P.C.

(57) ABSTRACT

A method is provided for operating a multi-bandwidth OFDMA system that can achieve an enhanced bandwidth efficiency due to windowing without significantly impacting the underlying physical design of the receive filters. The method comprises establishing a bandwidth over which the radio resources transmit signals, the bandwidth being comprised of an edge-band and a center-band. Narrow band radio resources are assigned to a portion of the bandwidth that is at least partially within the edge-band.

8 Claims, 9 Drawing Sheets

US 7,782,900 B2

METHOD FOR INCREASING SPECTRUM EFFICIENCY IN AN OFDM BASED MULTI-BANDWIDTH WIRELESS SYSTEM

BACKGROUND OF THE INVENTION

1. Field of the Invention

This invention relates generally to telecommunications, and, more particularly, to wireless communications.

2. Description of the Related Art

In the field of wireless telecommunications, such as cellular telephony, a typical system 100, as shown in FIG. 1, includes a plurality of base stations 130 (e.g., Node Bs) distributed within an area to be serviced by the system. Various Access Terminals 120 (ATs, also known as User Equipment (UE), mobile devices, and the like) within the area may then access the system and, thus, other interconnected telecommunications systems, such as a publicly switched telephone system (PSTN) 160 and a Data network 125, via one or more of the base stations 130. Typically, an AT 120 maintains communications with the system 100 as it passes through an area by communicating with one and then another base station 130, as the AT 120 moves. The AT 120 may communicate with the closest base station 130, the base station 130 with the strongest signal, the base station 130 with a capacity sufficient to accept communications, etc. The base stations 130, in turn, communicate with a Radio Network Controller (RNC) 138, which communicates with a core network 165. Each RNC 138 is capable of supporting a plurality of base stations 130.

In systems employing Universal Mobile Telephone System (UMTS) Long Term Evolution (LTE), it has been proposed that Orthogonal Frequency-Division Multiple Access (OFDMA) be employed for the uplink and downlink multiple access scheme. OFDMA has very high side-lobes due to the use of the Discrete Fourier Transform as the orthogonal set for the frequency domain modulation or multiple access control. These high side-lobes substantially reduce Out Of Band Emissions (OOBE) and spurious emissions, which is very beneficial in the LTE.

While a transmit power shaping filter, such as the one specified in TS 25.104, Base Station (BS) Radio Transmission and Reception (FDD), 3GPP, can meet the spectrum emission requirement, R1-051203, Windowing and spectral containment for OFDM downlink, LTE contribution, Lucent Technologies has shown that a better alternative is though a windowing function. Instead of filtering the transmitted signal, i.e., performing convolution in time domain, the windowing processing function multiplies the transmitted signal with a well-designed time sequence. Each OFDM symbol, plus the attached cyclic-prefix (CP) is multiplied in point-to-point fashion by a shaping sequence (windowing). This shaping function is chosen such that it has a short transition period at the beginning and end and remains constant in the middle. It reduces the OOBE at a small cost of effective CP reduction. This process is illustrated in FIG. 2.

The benefit of the windowing function is not only its implementation simplicity, but it also has a reduced guardband to meet out-of-band emission requirement. The reduced guardband increases the spectrum efficiency, especially in a wider bandwidth system. FIG. 3 shows 5 M, 10 M and 20 M Hz bandwidth OFDMA systems, using a window function of about 3.6% provides the amount of guardband required in UMTS.

Note that, with the same amount of windowing, required guardband does not increase with bandwidth. Thus, counting the cost on CP reduction, the overheads due to spectrum containment for 5 M, 10 M and 20 M Hz OFDM systems are around 13.2%, 8.4% and 6.0%. This compares favorably to a typical overhead of 25% for a single-carrier CDMA system and offers a significant spectrum efficiency advantage. FIG. 4 shows the spectrum of a typical CDMA system.

It should be noted that, windowing works well for wide band systems, but for narrower bands, e.g., 1.25 M Hz bandwidth system, windowing alone is not enough. Further filtering may be needed to shape the spectrum.

While such windowing function allows less guardband and thus increases spectrum efficiency on the transmission side, it does impose significant challenges to the receiver design, mainly in term of the required channel selectivity. Channel selectivity is the ability of a receiver to extract a signal from its own band and reject a signal on an adjacent band. By having less guardband on the transmission side, not only is interfering power on the adjacent band moved closer to the receiver's own band, but additionally, the receiver has to extend its filter pass-band as well to match the expanded information bandwidth from the transmitter. Thus, from the perspective of a receiver filter, not only is the attenuation requirement increased (although by a moderate amount), but also, the allowed transition band is significantly shortened. This puts a significant challenge on the receiver filter design, especially for cost-sensitive mobile units.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one aspect of the instant invention, a method is provided for managing radio resources. The method comprises establishing a bandwidth over which the radio resources transmit signals, the bandwidth being comprised of an edge-band and a center-band. A narrow band radio resource is assigned to a portion of the bandwidth that is at least partially within the edge-band.

BRIEF DESCRIPTION OF THE DRAWINGS

The invention may be understood by reference to the following description taken in conjunction with the accompanying drawings, in which like reference numerals identify like elements, and in which.

Figure 1:
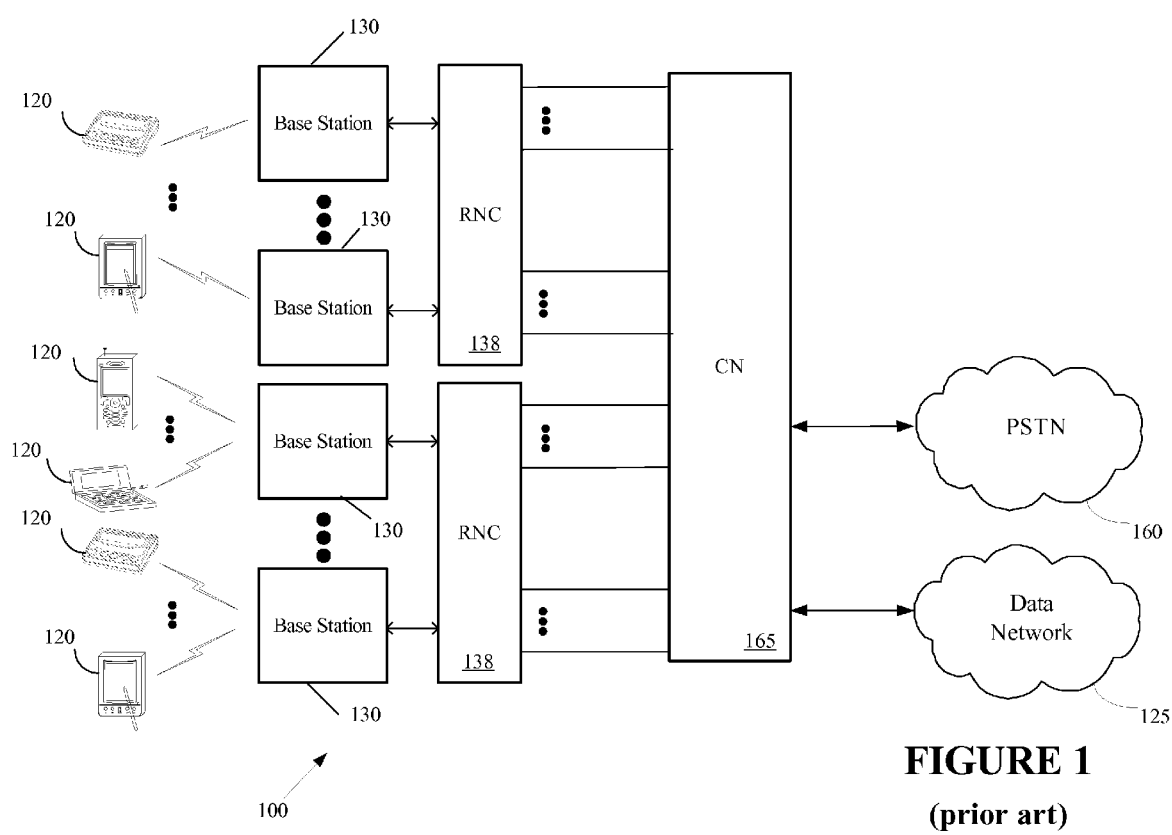
FIG. 1 is a block diagram of a prior art communications system, such as a Universal Mobile Telephone System (UMTS) in accordance with one embodiment of the present invention.
Figure 2:
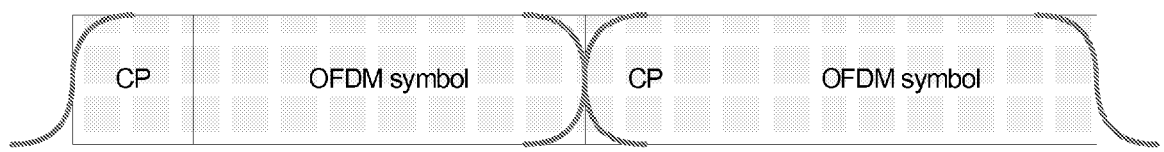
FIG. 2 is a stylized illustration of an OFDM symbol with cyclic prefix and its waveform.
Figure 3:
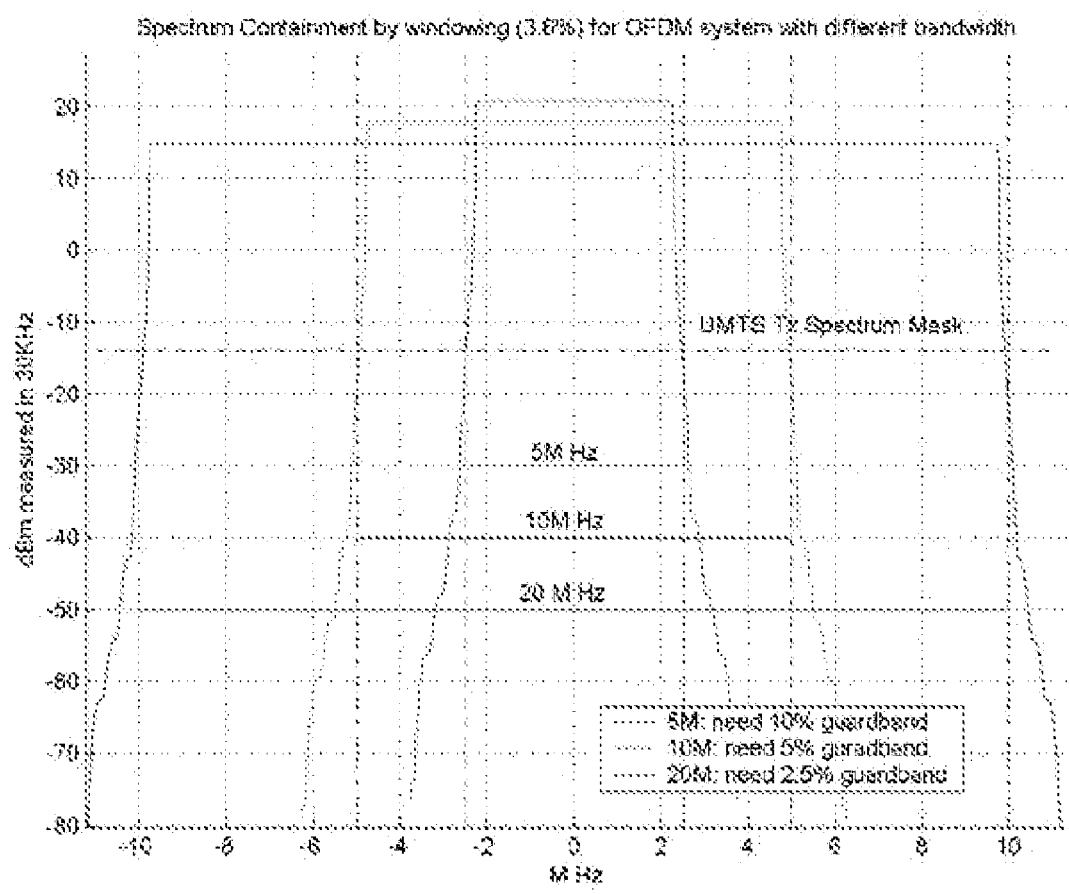
FIG. 3 is a graphical representation of guard bands required for 5 MHz, 10 MHz, and 20 MHz systems to meet the UMTS out-of-band emission specification.
Figure 4:
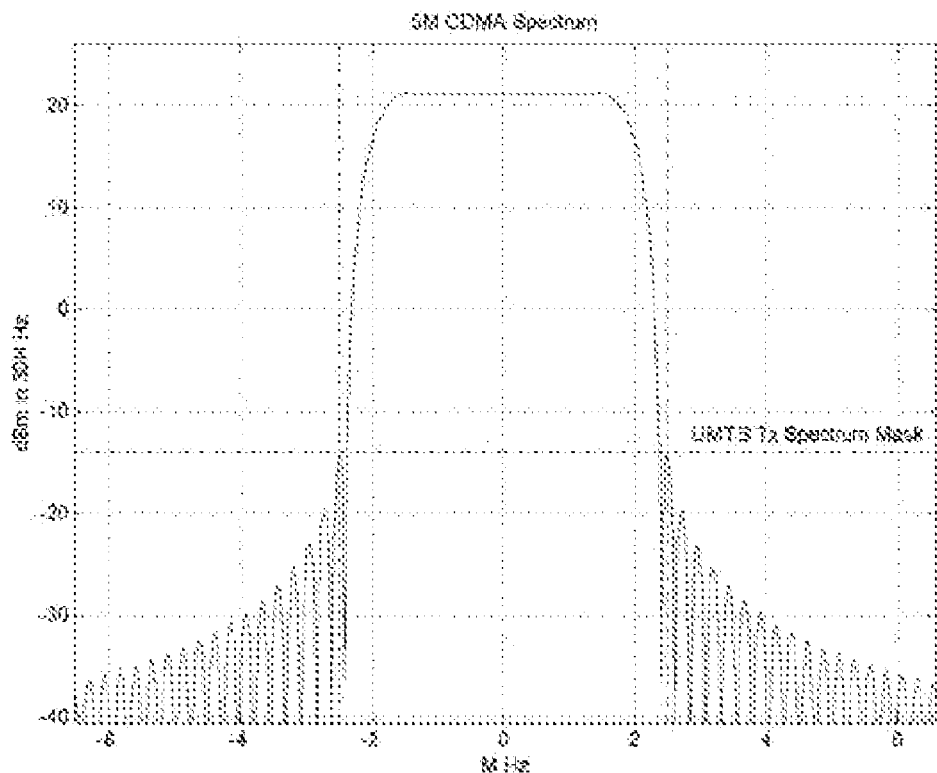
FIG. 4 is a graphical representation of a spectrum of a typical CDMA system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the following written description and associated figures describe one embodiment of a method of operating a multi-bandwidth OFDMA system that can achieve an enhanced bandwidth efficiency due to windowing without significantly impacting the underlying physical design of the receive filters. Generally, the instant invention may find application in an OFDMA system having a bandwidth of 10 MHz, 20 MHz or more. However, for illustrative purposes, the invention is described herein in the context of an OFDMA system having a bandwidth that is about 20 MHz. The wireless system 100 supports a plurality of the ATs 120 operating simultaneously over the whole bandwidth. These ATs 120 may be of difference classes, operating on potentially different bandwidths. For example, a high-end Class A AT 120 may be able to operate on a wide bandwidth, e.g., 10 MHz or 20 MHz, while a Class B AT 120, being a low-cost terminal offering low data rate and voice, may operate only on a narrow bandwidth, e.g., 1.25 MHz. The wireless system 100 dynamically places the ATs 120 on different frequencies by means of scheduling. In the exemplary embodiment of the instant invention described herein, a Frequency Division Duplex (FDD) system may be employed, where an uplink (UL) used for carrying information from the AT 120 to the base station 130 is paired with a downlink (DL) carrying information from the base station 130 to the AT 120.

In the downlink, the base station 130 applies the windowing function (~3.6% in time) and a small amount of guardband (~2.5% in frequency) for the 20 MHz system. As discussed above, the Out-Of-Band Emission (OOBE) of such a system provides the amount of guardband required in UMTS.

Figure 5:
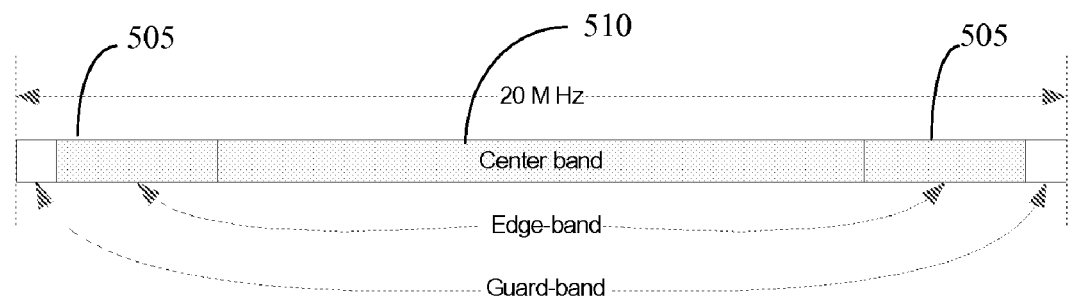
FIG. 5 is a graphical representation of a bandwidth used by a particular category of AT, where the bandwidth is partitioned into an edge-band and a center-band.
Figure 6:
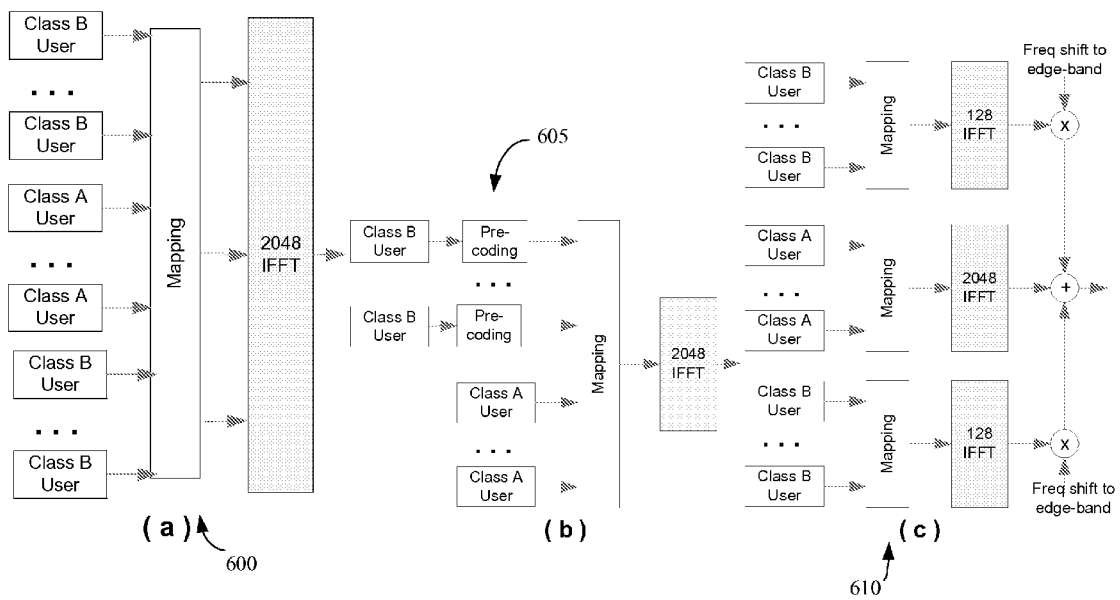
FIG. 6 is a block diagram of alternative methods used by a base station to perform Fast Fourier Transform (FFT) processing.

As shown in FIG. 5, the bandwidth is partitioned into two categories: an edge-band 505 and a center-band 510. It should be appreciated that there are two edge-bands 505 located at the two ends of the bandwidth. In one embodiment of the instant invention, each of the edge bands 505 have a bandwidth matching approximately the smallest AT 120 supported bandwidth, e.g., 1.25 MHz in the exemplary embodiment described herein. While sub-frequencies (or tones) in the center-band 510 can be allocated to ATs 120 of all access capabilities, sub-frames (or tones) in the edge-band 505 can only be allocated to those ATs 120 of the lowest access capability (e.g., the AT 120 that can only operate on 1.25 MHz). The partition is illustrated in the following:

As shown in FIG. 6, the base station 130 utilizes proper Fast Fourier Transform (FFT) processing, for example, by means of (1) direct mapping user data to each tone 600, (2) pre-coding 605 before IFFT or (3) separate IFFT multiplexing 610. Advantageously, such a multi-band multiplexing operation may be accomplished in the baseband digital domain with no or little added cost.

Under such a scheme, the base station 130 could utilize all 20 MHz bandwidth except on two small guard-bands (which is only ~6% of total bandwidth). Thus, the base station 130 has a 94% spectrum utilization efficiency.

Figure 7:
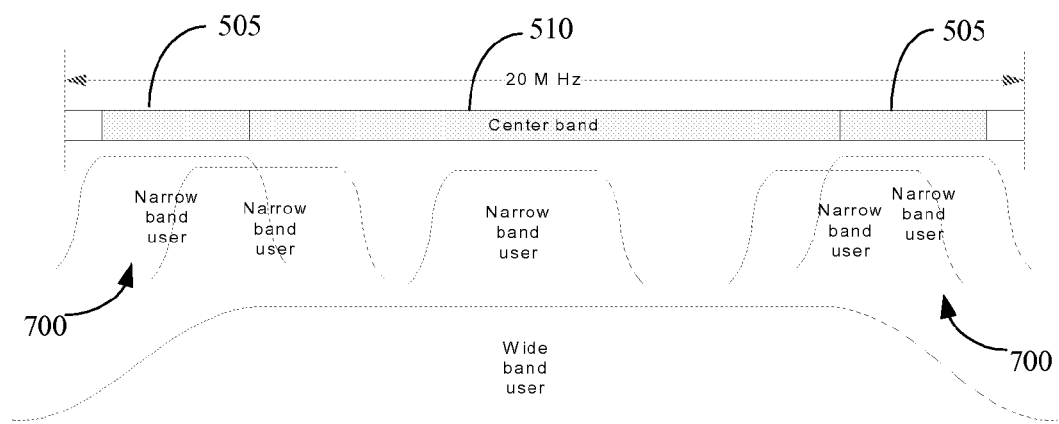
FIG. 7 is graphical representation of a method for locating narrow band ATs in the edge-band and relying on the inherently sharper receive filter to reject interference from neighboring bands.

This scheme does not impose a more stringent requirements on the receive filter. As illustrated in FIG. 7, this is due to the practice of placing narrow band ATs 700 in the edge-band and relying on the inherently sharper receive filter to reject interference from neighboring bands. Other portions including R/analog components are not impacted as well.

Figure 8:
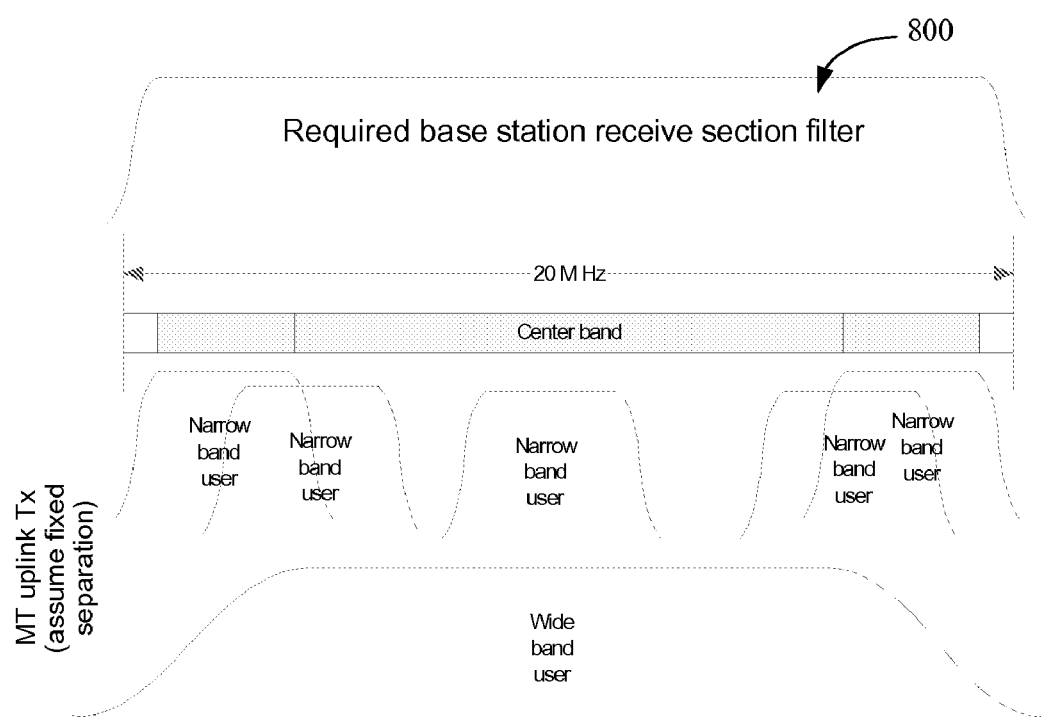
FIG. 8 is a graphical representation illustrating that prior systems required the base station receive section filter to encompass the entire bandwidth.

For the FDD system, uplink uses a band paired to the downlink with a fixed frequency separation, frequency separation, e.g., 80 MHz in UMTS. Usually, the AT 120 is designed based on the fixed separation in general, e.g., if its downlink operates at the frequency f, its uplink will need to operate at the frequency of f+f_separation. In one embodiment of the instant invention, such a fixed DL/UL separation based AT 120 presents a significant challenge to base station 130 receiver design. This is illustrated in FIG. 8, where it is shown graphically that the required base station receive section filter 800 encompasses the entire bandwidth. Such a stringent requirement is prohibitive even for the base station 130 that can tolerate a relatively high cost and complexity.

In an alternative embodiment of the instant invention, it may be useful for the system 100, to dynamically have DL/UL frequency separation by a multiple of a defined unit of the bandwidth, e.g., for a 1.25M user, its UL frequency=DL frequency+/−k*1.25 M. Thus, users can be allocated in the uplink in the fashion described below.

Figure 9:
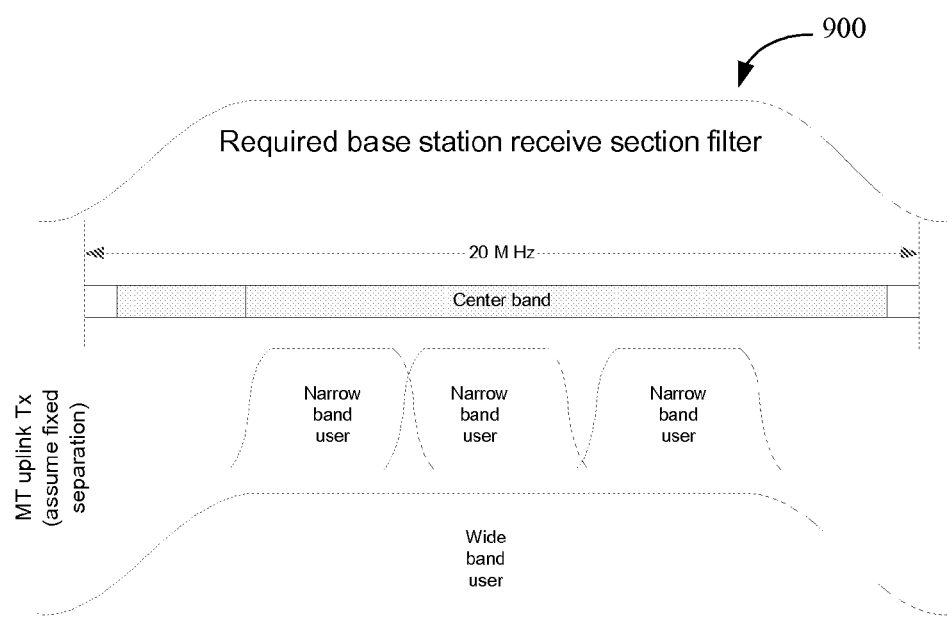
FIG. 9 is a graphical representation illustrating that one embodiment of the instant invention substantially reduces the base station receive section filter to encompass less than the entire bandwidth.

Such a flexible DL/UL separation requirement may impact the transceiver design in the base station 130. FIG. 8 shows that the fixed DL/UL separation leads to a received filter (800) at the base station 130 that has a relatively sharp transition. FIG. 9, on the other hand, shows that the flexible DL/UL separation leads to a received filter 900 that has a relatively smooth transition. The sharper the filter transition, the more expensive the cost and the longer the delay is.

In essence, under the proposed scheme, the uplink maintains the same spectrum utilization efficiency as a typical single carrier system. In other words, the gain in spectrum efficiency is on the downlink. This is not a significant issue because it is expected the downlink will be the dominant link in a data centric system.

In summary, this scheme achieves 16% gain (6% overhead vs. 22%) over a typical single-carrier CDMA system with little or no additional cost. Even with possibly more stringent filter requirement, the OFDMA systems proposed in the LTE standard have an overhead (14%) even for a 20 M Hz case. This proposed scheme presents a significant advantage in spectrum utilization efficiency.

Those skilled in the art will appreciate that the various system layers, routines, or modules illustrated in the various embodiments herein may be executable control units. The controllers may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the controllers cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. A method for managing radio resources of an orthogonal frequency division multiple access (OFDMA) wireless communication system configured to provide wireless connectivity to multiple mobile units that communicate using different bandwidths, the method comprising:

allocating radio resources to at least one first mobile unit in at least one of two edge-bands when the bandwidth capability of said at least one first mobile unit is less than or approximately equal to the bandwidth of the edge bands; and allocating radio resources to at least one second mobile unit in a center-band when the bandwidth of the center band is large enough to support the bandwidth capability of said at least one second mobile unit and the bandwidth of the edge bands is insufficient to support the bandwidth capability of said at least one second mobile unit because the bandwidth capability of said at least one second mobile unit is greater than the bandwidth of the edge bands, wherein the center band is bracketed by the edge bands.

2. The method of claim 1, wherein allocating radio resources to said at least one second mobile unit comprises scheduling said at least one second mobile unit on at least one frequency within the center-band.

3. The method of claim 2, wherein scheduling said at least one second mobile unit on at least one frequency within the center-band comprises allocating a sub-frame or tone in the center-band to said at least one-second mobile unit.

4. The method of claim 1, wherein allocating radio resources to said at least one first mobile unit comprises scheduling said at least one first mobile unit on at least one frequency within the edge-band.

5. The method of claim 4, wherein scheduling said at least one first mobile unit on at least one frequency within the center-band comprises allocating a sub-frame or tone in the edge-band to said at least one first mobile unit.

6. The method of claim 1, wherein allocating radio resources to said at least one first mobile unit and said at least one second mobile unit comprises at least one of a directly mapping user data to subframes or tones, pre-coding the user data before performing an inverse fast Fourier transform and mapping user data to the subframes or tones, or separately multiplexing the inverse fast Fourier transformed user data and mapping the user data to the subframes or tones.

7. The method of claim 1, wherein the bandwidth of the edge bands is approximately 1.25 MHz and wherein allocating radio resources to said at least one first mobile unit in said at least one of the two edge-bands comprises allocating radio resources to said at least one first mobile unit when the bandwidth capability of the first mobile unit is approximately 1.25 MHz.

8. The method of claim 7, wherein the bandwidth of the center band is greater than or equal to 10 MHz, and wherein allocating radio resources to said at least one second mobile unit in the center band comprises allocating radio resources to said at least one second mobile unit when the bandwidth capability of the second mobile unit is greater than 1.25 MHz.

* * * * *